US012703265B2

(12) United States Patent
Elshaer

(10) Patent No.: US 12,703,265 B2
(45) Date of Patent: Aug. 11, 2026

(54) ACTIVE RIPPLE ENERGY STORAGE CIRCUIT IMPLEMENTATION USING THE INVERTER SYSTEM CONTROLLER AND ELECTRIC MACHINE

(71) Applicant: Ford Global Technologies, LLC, Dearborn, MI (US)

(72) Inventor: Mohamed Elshaer, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 97 days.

(21) Appl. No.: 18/418,790

(22) Filed: Jan. 22, 2024

(65) Prior Publication Data

US 2025/0236207 A1 Jul. 24, 2025

(51) Int. Cl.
*B60L 58/13* (2019.01)
*B60L 53/62* (2019.01)

(52) U.S. Cl.
CPC ............... *B60L 58/13* (2019.02); *B60L 53/62* (2019.02); *B60L 2210/40* (2013.01)

(58) Field of Classification Search
None
See application file for complete search history.

(56) References Cited

U.S. PATENT DOCUMENTS

| | | | | |
|---|---|---|---|---|
| 8,570,774 | B2 | 10/2013 | Wang et al. | |
| 10,177,685 | B2 | 1/2019 | Gu et al. | |
| 2011/0196692 | A1* | 8/2011 | Chavez, Jr. | B60L 53/665 700/297 |
| 2017/0282747 | A1 | 10/2017 | Wang | |
| 2018/0241337 | A1* | 8/2018 | Zou | B60L 3/003 |
| 2020/0006939 | A1* | 1/2020 | Lan | H02J 1/02 |
| 2024/0079984 | A1* | 3/2024 | Huang | H01M 10/625 |
| 2025/0135928 | A1* | 5/2025 | Liang | B60L 1/006 |

* cited by examiner

*Primary Examiner* — Daniel C Puentes
*Assistant Examiner* — Joel Barnett
(74) *Attorney, Agent, or Firm* — David B. Kelley; Brooks Kushman P.C.

(57) ABSTRACT

An automotive power system has circuitry, including a capacitor, inductor, and switch in series, connected such that a terminal of the switch is directly connected with only one phase leg of an inverter system controller between an electric machine and the inverter system controller and a terminal of the capacitor is referenced to a negative terminal of a traction battery. The switch is closed while the traction battery is being charged with energy from an AC grid, and open while the traction battery is not being charged.

12 Claims, 6 Drawing Sheets

42
30
BCCM
HV
Battery
32
28
EMI
Filter
AC
Source
44
34
C
B
A
26
36
50
40
Controller
38
48
46

40
20
0
-20
-40
$I_{ISC}$ (A)
0
0.01
0.02
0.03
Time (s)

50
0
$I_{Battery}$ (A)
0
0.01
0.02
0.03
Time (s)

ACTIVE RIPPLE ENERGY STORAGE CIRCUIT IMPLEMENTATION USING THE INVERTER SYSTEM CONTROLLER AND ELECTRIC MACHINE

TECHNICAL FIELD

This disclosure relates to automotive power systems.

BACKGROUND

An automotive vehicle may use electrical energy to power an electric machine. The electric machine may convert this electrical energy to mechanical energy to propel the vehicle. The automotive vehicle may include various power electronics equipment to condition and store electrical energy.

SUMMARY

An automotive power system includes a traction battery, an electric machine including Y-connected windings, an inverter system controller connected between the traction battery and electric machine, and circuitry, including a capacitor, inductor, and switch in series, connected such that a terminal of the switch taps a neutral point of the Y-connected windings, and a terminal of the capacitor is referenced to a negative terminal of the traction battery.

A vehicle includes a traction battery, an electric machine, an inverter system controller connected between the traction battery and electric machine, circuitry, and a controller. The circuitry includes a capacitor, inductor, and switch in series, and is connected such that a terminal of the switch is directly connected with only one phase leg of the inverter system controller between the electric machine and inverter system controller and a terminal of the capacitor is referenced to a negative terminal of the traction battery. The controller closes the switch while the traction battery is being charged with energy from an AC grid and opens the switch while the traction battery is not being charged.

A method includes, responsive to a command to charge a traction battery with energy from an AC grid, closing a switch of circuitry including a capacitor and inductor connected in series with the switch such that a terminal of the switch is directly connected with the electric machine and a terminal of the capacitor is referenced to a negative terminal of the traction battery that connects an inverter system controller between the traction battery and electric machine.

DETAILED DESCRIPTION

Figure 1:
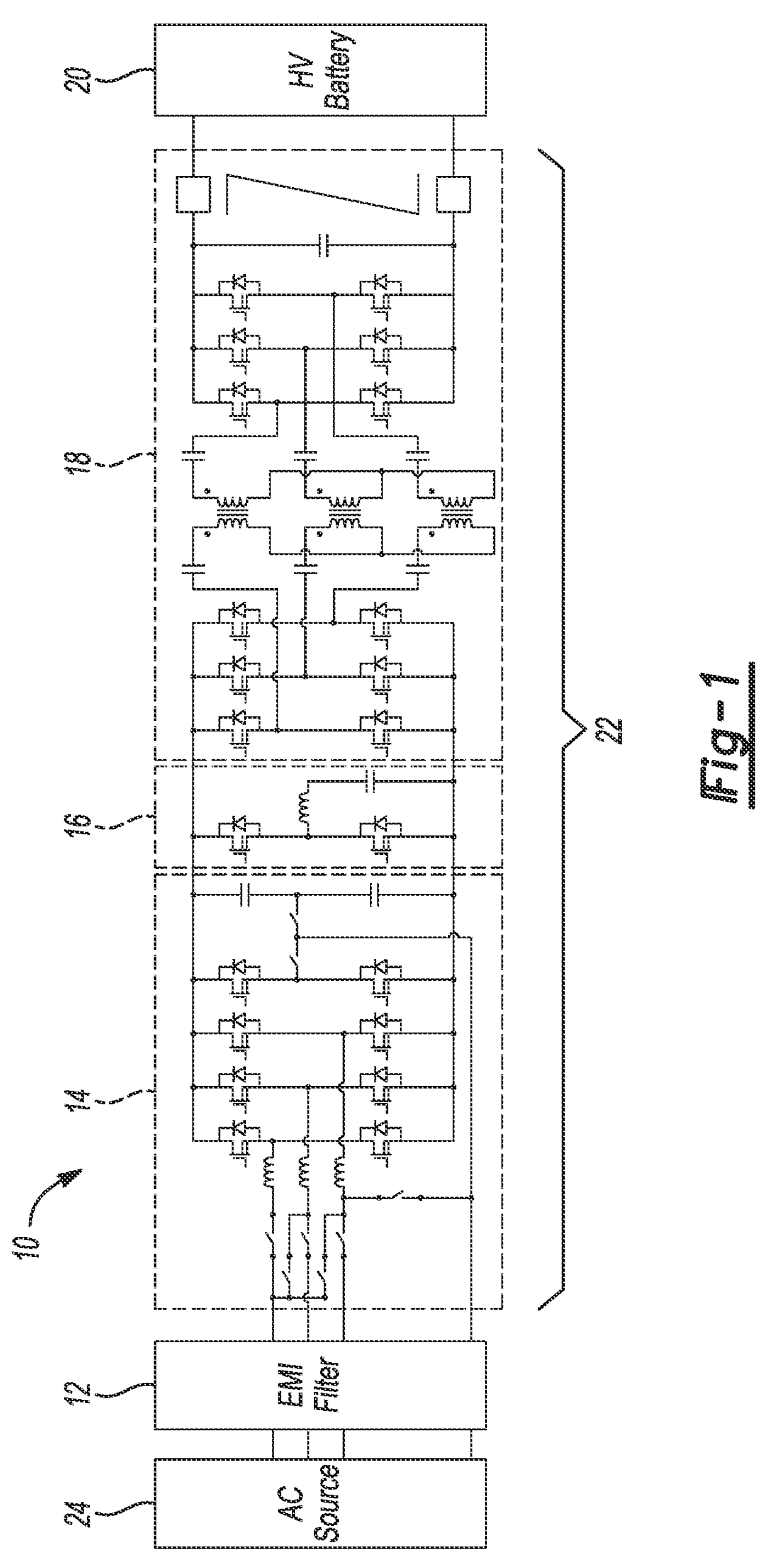
FIG. 1 is a schematic diagram of a system including a battery current control module with an active ripple energy storage circuit.

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Charging a traction battery with DC current may require a battery current control module to include a bulky electrolytic capacitor bank. This capacitor bank may consume upwards of 18% of the overall battery current control module package volume. To help increase the battery current control module's power density, an active ripple energy storage circuit can be added, which is estimated to reduce the overall electrolytic capacitor bank size by 70%.

Battery current control modules play a role in managing the flow of electric current to and from the battery. Battery current control modules function as control units that interface between the battery, the charging system, and the electrical loads. They monitor and control various parameters such as battery state of charge, voltage, and temperature, and based on this information, they manage the flow of current to the battery. Battery current control modules may facilitate charging control by overseeing the charging process of the battery and managing the voltage and current supplied by the charging system. By monitoring the battery's state of charge and adjusting the charging parameters accordingly, battery current control modules attempt to ensure the battery receives the appropriate level of charge to maintain performance. Similarly, battery current control modules may be responsible for discharging control. They can manage the current output from the battery to the electrical loads in the vehicle. By controlling the current flow, battery current control modules may ensure a controlled supply of power to the various electrical components and systems. Battery current control modules may also implement various measures for the battery. For instance, they may monitor battery temperature to prevent overheating. They may also detect overvoltage or undervoltage situations and implement measures to preclude short circuits or excessive current draw. Battery current control modules may feature diagnostic capabilities. These modules can monitor the health and performance of the battery system. They can log codes and provide diagnostic information, facilitating maintenance.

Communication interfaces are often incorporated into battery current control modules. These interfaces, such as Controller Area Network or Local Interconnect Network, allow battery current control modules to exchange information with other vehicle systems, including the engine control unit (if present) or the body control module. This enables coordinated operation and integrated control across various vehicle functions. Battery current control modules can receive commands or instructions from other control units and adjust current flow accordingly.

Referring to FIG. 1, an onboard charger circuitry topology 10 includes an electromagnetic interference filter 12, a bidirectional power factor correction circuit 14 (e.g., a single/three phase bidirectional totem pole power factor correction circuit), an active ripple energy storage circuit 16, an isolated high voltage DC/DC converter 18, and a traction battery 20. The bidirectional power factor correction circuit 14 is connected between the electromagnetic interference filter 12 and active ripple energy storage circuit 16. The active ripple energy storage circuit 16 is connected between the bidirectional power factor correction circuit 14 and isolated high voltage DC/DC converter 18. The isolated high voltage DC/DC converter 18 is connected between the active ripple energy storage circuit 16 and traction battery 20. The bidirectional power factor correction circuit 14, active ripple energy storage circuit 16, and isolated high voltage DC/DC converter 18 thus form a battery current control module 22. The onboard charger circuitry topology 10 is connected with an AC source 24 (e.g., AC grid) via the electromagnetic interference filter 12. Power from the AC source 24 may thus charge the traction battery 20.

The add-on circuitry for the active ripple energy storage circuit 16 can increase the electric circuit bill of material. The reduction in package size may not be sufficient to justify the increase. Hence, there is a need to eliminate the active ripple energy storage circuit 16 by implementing its function using an existing power module that is available on the high voltage bus.

Figure 2:
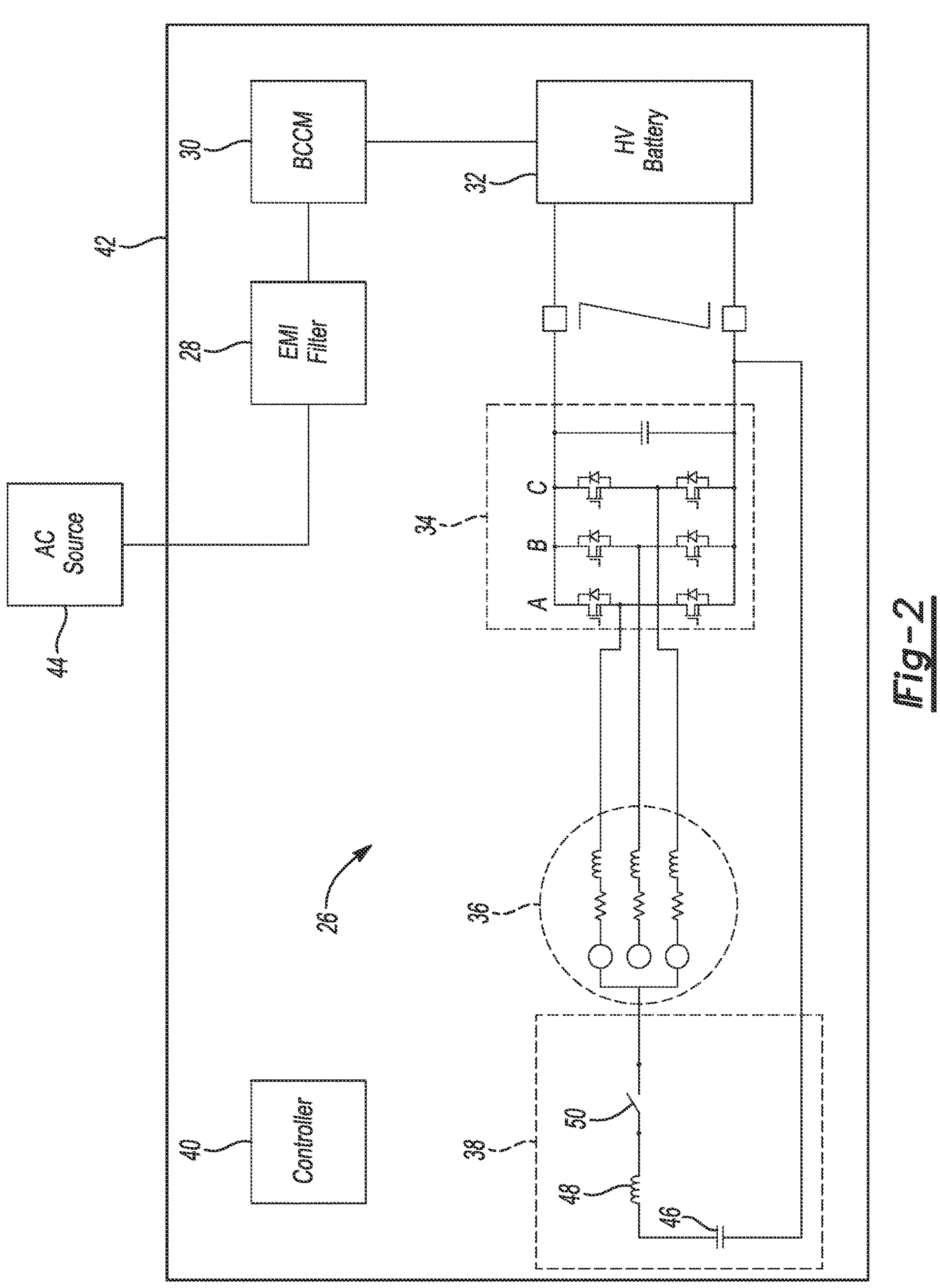
FIG. 2 is a schematic diagram of a system implementing an active ripple energy storage circuit by tapping a neutral point of a Y-connected electric machine.

Here, an inverter system controller and electric propulsion machine are configured to perform the function of an active ripple energy storage circuit. Referring to FIG. 2, an onboard charger circuitry topology 26 includes an electromagnetic interference filter 28, a battery current control module 30, a traction battery 32, an inverter system controller 34, a Y-connected electric machine 36, additional circuitry 38, and a controller 40. These components are part of vehicle 42. The battery current control module 30 is like the battery current control module 22 except it lacks an active ripple energy storage circuit: The bidirectional power factor correction circuit is directly connected to the isolated high voltage DC/DC converter. The battery current control module 30 is connected between the electromagnetic interference filter 28 and traction battery 32. The inverter system controller 34 is connected between the traction battery 32 and Y-connected electric machine 36. The electromagnetic interference filter 28 is connected with an AC source 44. The controller 40 is in communication with/performs control operations for the components of the vehicle 42.

The additional circuitry 38 includes a capacitor 46, an inductor 48, and a switch 60. The inductor 48 is series connected between the capacitor 46 and switch 50. The capacitor 46 and inductor 48 thus form an LC filter. A terminal of the capacitor 46 is directly connected with a negative rail of the traction battery 32. A terminal of the switch 50 taps a neutral point of the Y-connected electric machine 36.

When the vehicle 42 is connected to the AC source 44 and the battery current control module 30 is charging the traction battery 32, the switch 50 is closed. The inverter system controller 34, Y-connected electric machine 36, and additional circuitry 38 form a multi-phase (e.g., 3-phase) interleaved bi-directional buck/boost converter. This system is controlled to store energy and discharge energy in the capacitor 46, which is expected to see a ripple voltage proportional to the power delivered to the traction battery 32. The inverter system controller AC current is controlled to minimize the ripple current delivered to the traction battery 32. The current generated by the inverter system controller 34 is synchronized with the AC source voltage. The inverter system controller 34 is controlled to generate an AC current, having an average value of zero, that is proportional to and synchronized with the AC current generated by the battery current control module 30. When the vehicle 42 is in drive mode, the switch 50 is opened to disconnect the additional circuitry 38 from the Y-connected electric machine 36.

Figure 3:
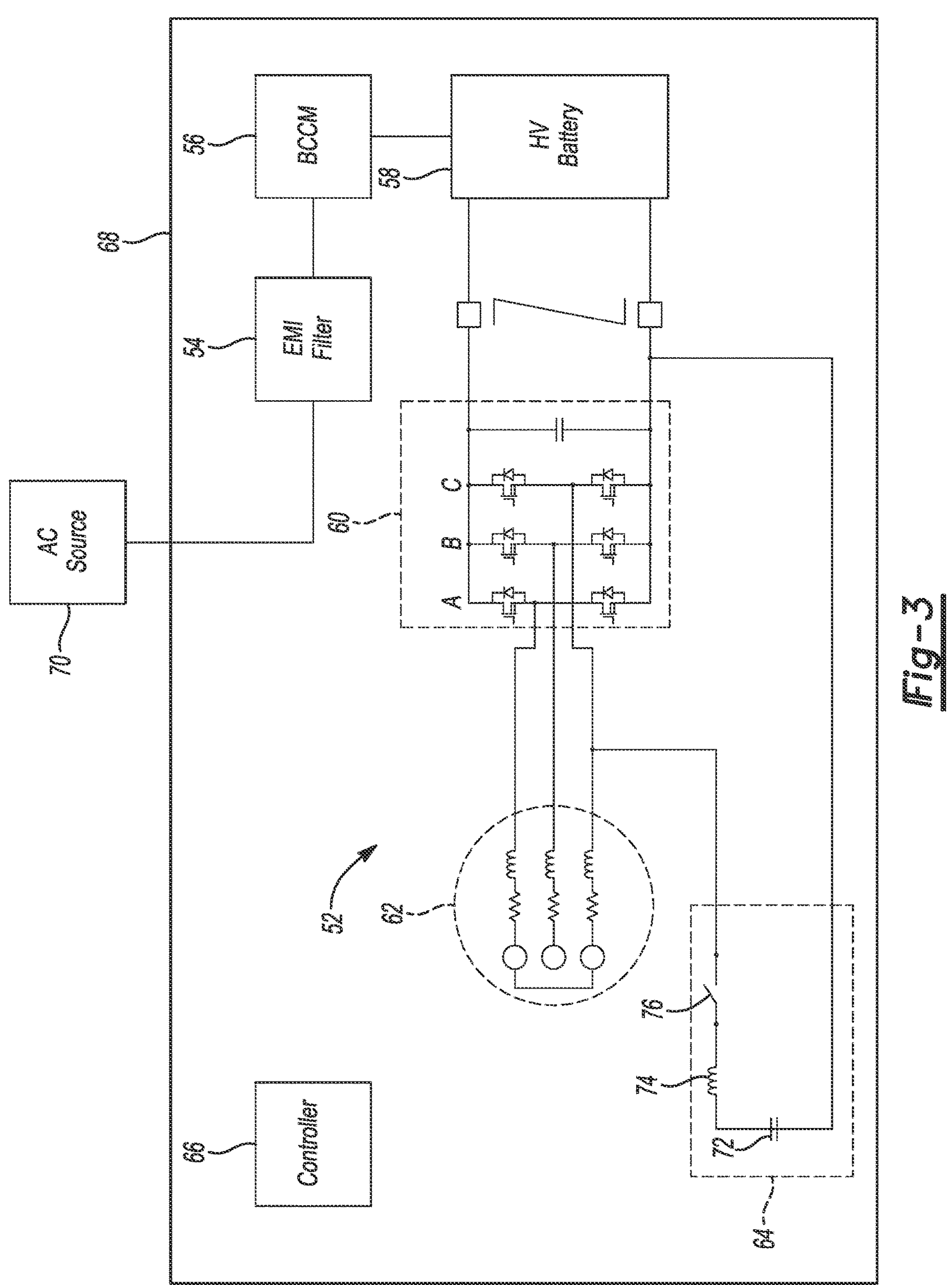
FIG. 3 is a schematic diagram of a system implementing an active ripple energy storage circuit without using electric machine windings.

Referring to FIG. 3, an onboard charger circuitry topology 52 includes an electromagnetic interference filter 54, a battery current control module 56, a traction battery 58, an inverter system controller 60, a Y-connected electric machine 62, additional circuitry 64, and a controller 66. These components are part of vehicle 68. The battery current control module 56 is like battery current control module 30. The electromagnetic interference filter 54 is connected with an AC source 70. The controller 66 is in communication with/performs control operations for the components of the vehicle 68. Other than the additional circuitry 64, the layout out of the mentioned components is like that of FIG. 2.

The additional circuitry 64 includes a capacitor 72, an inductor 74, and a switch 76. The inductor 74 is series connected between the capacitor 72 and switch 76. The capacitor 72 and inductor 74 thus form an LC filter. A terminal of the capacitor 72 is directly connected with a negative rail of the traction battery 58. A terminal of the switch 76 is directly connected between a coil of the Y-connected electric machine 64 and a corresponding phase leg of the inverter system controller 60.

This implementation allows for using the inverter system controller 60 to implement the active ripple energy storage function without modifying the Y-connected electric machine 62. The traction inverter 60 is used to configure the elements within one phase pole of the inverter 60 to operate it as a buck/boost-controlled DC-DC converter. The circuit is constructed by using two switches from the existing inverter system controller 60. The additional circuitry 64 is connected to only one of the inverter system controller's switching legs and referenced to the traction battery's high voltage DC−. When the vehicle 68 is connected to the AC source 70 and the battery current control module 56 is charging the traction battery 58, the switch 76 is closed. Leg A and leg B of the inverter system controller 60 are not switched. Only leg C is modulated to control the current generated by the inverter system controller 60. Leg C and the LC filter in the additional circuitry 64 form a bidirectional buck/boost converter that performs the function of an active ripple energy storage circuit. This system is controlled to store energy and discharge energy in the capacitor 72, which is expected to see a ripple voltage proportional to the power delivered to the traction battery 58. The inverter system controller's AC current is controlled to minimize the ripple current delivered to the traction battery 58. The current generated by the inverter system controller 60 is synchronized with the AC source voltage. The inverter system controller 60 is controlled to generate an AC current that is proportional to and synchronized with the AC current generated by the battery current control module 56, with an average value of zero. When the vehicle 68 is in drive mode, the switch 76 is opened to disconnect the inverter system controller 60 from the additional circuitry 64.

Figure 4:
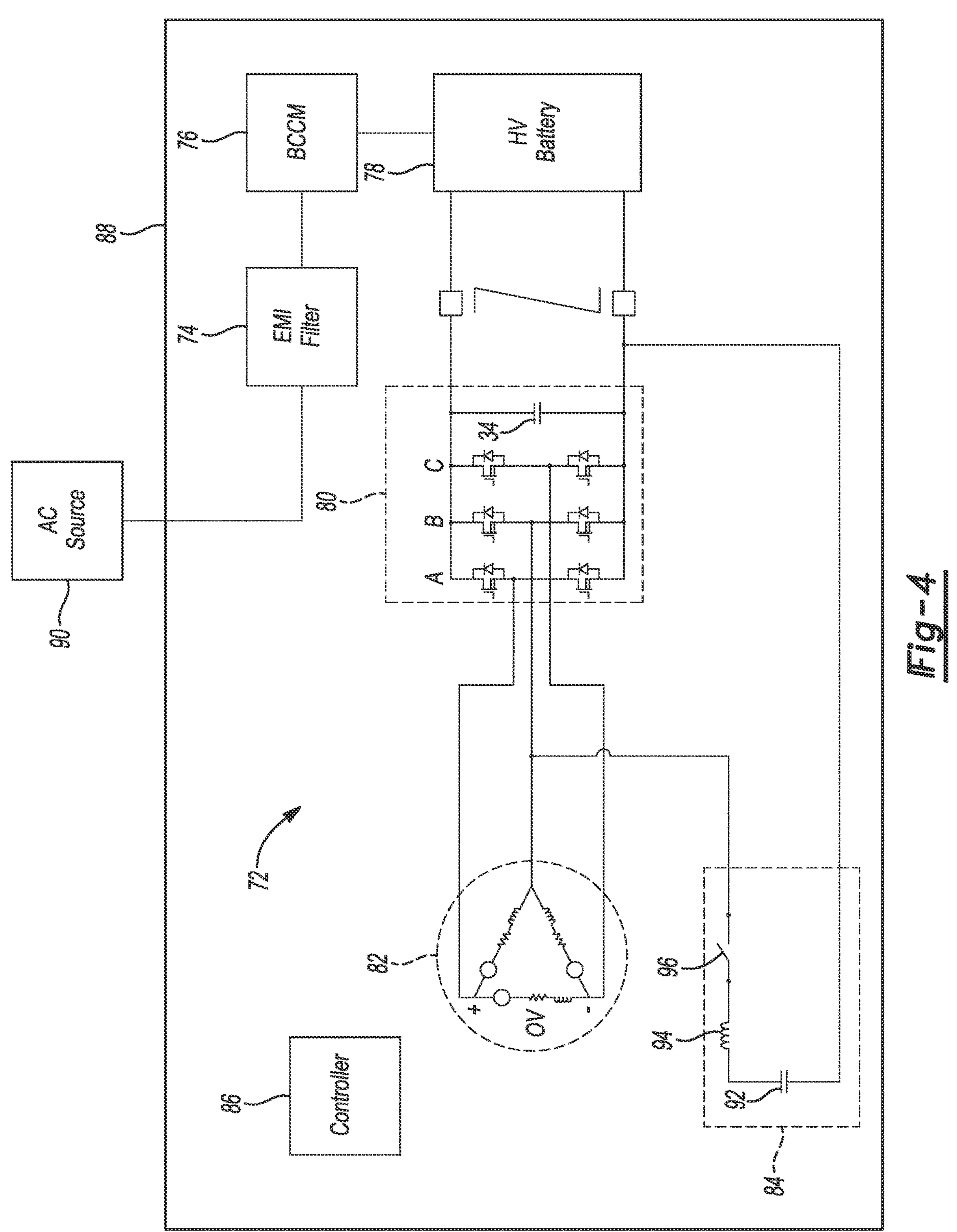
FIG. 4 is a schematic diagram of a system implementing an active ripple energy storage circuit using an inverter system controller and a delta-connected electric machine.

Referring to FIG. 4, an onboard charger circuitry topology 72 includes an electromagnetic interference filter 74, a battery current control module 76, a traction battery 78, an inverter system controller 80, a delta-connected electric machine 82, additional circuitry 84, and a controller 86. These components are part of vehicle 88. The battery current control module 76 is like battery current control module 30. The electromagnetic interference filter 74 is connected with an AC source 90. The controller 86 is in communication with/performs control operations for the components of the vehicle 88. Other than the additional circuitry 84, the layout out of the mentioned components is like that of FIG. 2.

The additional circuitry 84 includes a capacitor 92, an inductor 94, and a switch 96. The inductor 94 is series connected between the capacitor 92 and switch 96. The capacitor 92 and inductor 94 thus form an LC filter. A terminal of the capacitor 92 is directly connected with a negative rail of the traction battery 58. A terminal of the switch 96 is directly connected between the delta-connected electric machine 84 and a corresponding phase leg of the inverter system controller 80.

When the vehicle 88 is connected to the AC source 90 and the battery current control module 76 is charging the traction battery 78, the switch 96 is closed. The stator winding of the delta-connected electric machine 82 creates the buck/boost inductor, thus not requiring an external inductor. If additional inductance is needed, an external inductor can be added. Two of the inverter legs are switched simultaneously with the same pulse to shape the input current and control the voltage across the energy storage capacitor 92. It is required that two of the legs be switched to create zero voltage across one of the phase windings so that two of the windings are connected in parallel. Current splits between the two paralleled windings and returns to the converter via nodes A and C. The same current flows through two of the windings. Thus, no magnetizing flux is induced in the delta-connected electric machine 82. Meanwhile, the leaked flux forms the buck/boost inductor. When the vehicle 88 is in drive mode, the switch 92 is opened to disconnect the inverter system controller 80 from the additional circuitry 84.

Figures 5A, 5B:
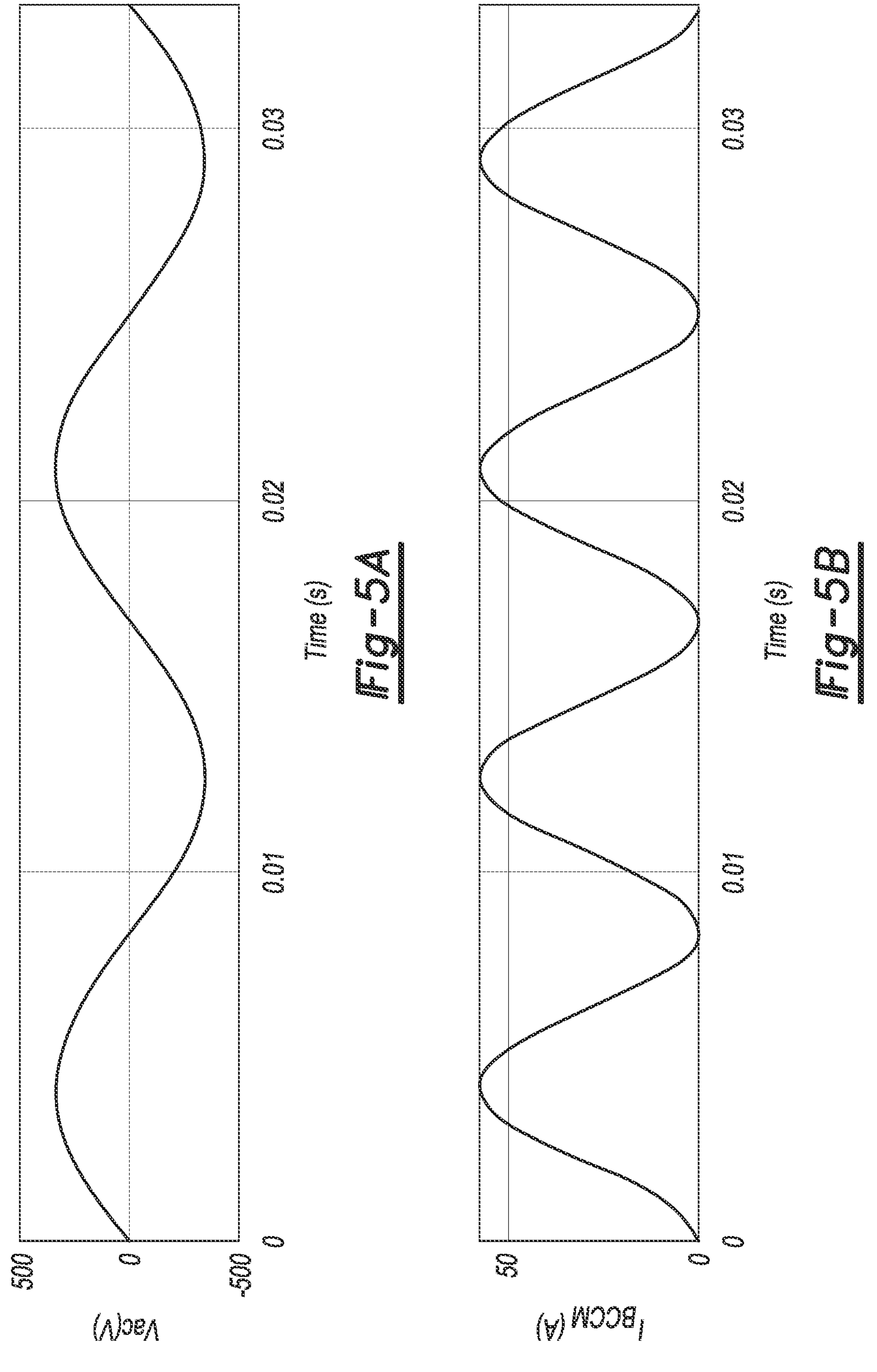
FIGS. 5A-5D are voltage or current waveforms generated by an AC grid, a battery current control module, an inverter system controller, and a battery respectively.
Figures 5C, 5D:
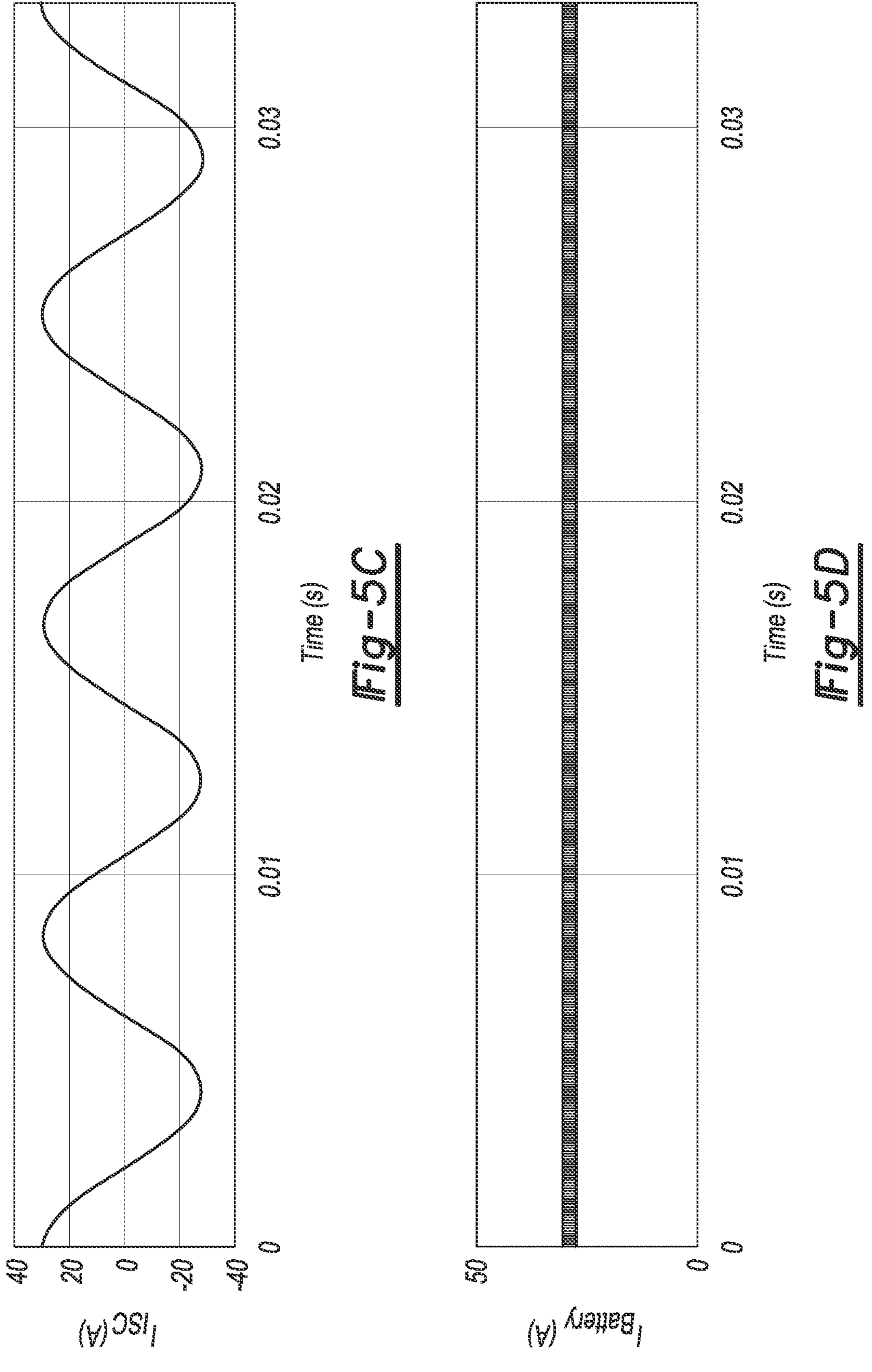

Referring to FIG. 5, the battery current control module in this example does not have an energy storage element. Hence, its output current is proportional to the AC grid's instantaneous power: When the AC grid voltage is zero, the output current of the battery current control module is zero. The inverter system controller is operated to absorb the ripple current by charging and discharging the capacitor in the additional circuitry. Hence, the net current delivered to the traction battery is DC.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims. The words used in the specification are words of description rather than limitation, and it is understood that various changes may be made without departing from the spirit and scope of these disclosed materials. The terms "controller" and "controllers," for example, can be used interchangeably herein as the functionality of a controller can be distributed across several controllers/modules, which may all communicate via standard techniques.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
- a traction battery;
- an electric machine;
- an inverter system controller connected between the traction battery and electric machine;
- circuitry, including a capacitor, inductor, and switch in series, connected such that a terminal of the switch is directly connected with only one phase leg of the inverter system controller between the electric machine and inverter system controller and a terminal of the capacitor is referenced to a negative terminal of the traction battery; and
- a controller programmed to close the switch while the traction battery is being charged with energy from an AC grid, and to open the switch while the traction battery is not being charged.

2. The vehicle of claim 1, wherein the electric machine includes Y-connected windings.

3. The vehicle of claim 2, wherein the controller is further programmed to activate switches of the only one phase leg to control current generated by the inverter system controller while the traction battery is being charged.

4. The vehicle of claim 2, wherein the controller is further programmed to operate the inverter system controller to generate AC current that is synchronized with a voltage of the AC grid.

5. The automotive power system of claim 2 further comprising other circuitry configured to transfer power from the AC grid to the traction battery, wherein the controller is further programmed to operate the inverter system controller to generate AC current that is synchronized with AC current generated by the other circuitry.

6. The automotive power system of claim 5, wherein the other circuitry defines a battery current control module.

7. The automotive power system of claim 2, wherein the controller is further programmed to operate the inverter system controller to generate current that has an average value of zero.

8. The automotive power system of claim 1, wherein the electric machine includes delta-connected windings.

9. The automotive power system of claim 8, wherein the controller is further programmed to operate the inverter system controller to create zero voltage across one of the delta-connected windings such that two of the delta-connected windings are in parallel.

10. A method comprising:

responsive to a command to charge a traction battery with energy from an AC grid, closing a switch of circuitry including a capacitor and inductor connected in series with the switch such that a terminal of the switch is directly connected with an electric machine and a terminal of the capacitor is referenced to a negative terminal of the traction battery that connects an inverter system controller between the traction battery and electric machine; and operating the inverter system controller to create zero voltage across one winding of the electric machine such that two windings of the electric machine are in parallel.

11. The method of claim 10 further comprising, responsive to a command to discontinue charge of the traction battery, opening the switch.

12. The method of claim 10 further comprising operating the inverter system controller to generate AC current that has an average value of zero.

* * * * *